US012542635B2

(12) United States Patent
Sakhnini et al.

(10) Patent No.: US 12,542,635 B2
(45) Date of Patent: Feb. 3, 2026

(54) CSI-RS RESOURCE MULTIPLEXING

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/807,555

(22) Filed: Jun. 17, 2022

(65) Prior Publication Data
US 2023/0412334 A1    Dec. 21, 2023

(51) Int. Cl.
*H04L 5/00* (2006.01)
*H04W 72/044* (2023.01)

(52) U.S. Cl.
CPC ....... *H04L 5/0048* (2013.01); *H04W 72/0466* (2013.01)

(58) Field of Classification Search
CPC ... H04L 5/0048; H04L 5/005; H04W 72/0466
See application file for complete search history.

(56) References Cited

U.S. PATENT DOCUMENTS

| 11,039,454 | B2 * | 6/2021 | Harada | H04L 5/0048 |
| 2014/0341048 | A1 * | 11/2014 | Sajadieh | H04L 5/0053 370/252 |
| 2019/0109686 | A1 * | 4/2019 | Jiang | H04L 5/0053 |
| 2023/0155758 | A1 * | 5/2023 | Park | H04L 27/261 370/329 |
| 2024/0172230 | A1 * | 5/2024 | Matsumura | H04L 5/0051 |

FOREIGN PATENT DOCUMENTS

EP          4266614 A1 * 10/2023 ........... H04L 5/0016

* cited by examiner

*Primary Examiner* — Aftab N. Khan
(74) *Attorney, Agent, or Firm* — Procopio, Cory, Hargreaves & Savitch LLP

(57) ABSTRACT

A UE may be configured to receive an indication of a CSI-RS configuration. The CSI-RS configuration may be received from a network entity. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The UE may be configured to receive the set of CSI-RSs based on the CSI-RS configuration and the CDM for the set of CSI-RSs. The CDM for the set of CSI-RSs may be associated with at least one of the plurality of RBs or the plurality of slots.

30 Claims, 12 Drawing Sheets

CSI-RS RESOURCE MULTIPLEXING

TECHNICAL FIELD

The present disclosure relates generally to communication systems, and more particularly, to a channel state information (CSI) reference signal (CSI-RS) configuration system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

CSI-RS may utilize a considerable amount of overhead resources. For example, if 32 ports are configured for an RS (using 32 REs of an RB), and the CSI-RS repeats every 4 slots, the overhead for CSI-RS may use about 5% of resources. CSI-RS may use even more than 5% of resources if different types of CSI-RS are configured for a UE using the same RBs—each of which may use about 5% of resources in the worst-case scenario. Some UEs may have a higher coherence bandwidth or a higher coherence time than other UEs. UEs that have such high coherence bandwidth and time may be able to multiplex CSI-RS resources that span RBs across a frequency domain, or span slots across a time domain, reducing the amount of overhead resources utilized by the CSI-RS. However, UEs that do not have such high coherence bandwidth and time may not be able to utilize CSI-RS that span RBs across a frequency domain or span slots across a time domain. There is a need to reduce the overhead resources of CSI-RS by multiplexing CSI-RS resources that span RBs across a frequency domain or span slots across a time domain when a UE is capable of using such CSI-RS resources, while also being able to use CSI-RS that do not span RBs across a frequency domain or do not span slots across a time domain when a UE is not capable of using such CSI-RS resources.

A UE may be configured to receive an indication of a CSI-RS configuration. The CSI-RS configuration may be received from a network entity. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The UE may be configured to receive the set of CSI-RSs based on the CSI-RS configuration and the CDM for the set of CSI-RSs. The CDM for the set of CSI-RSs may be associated with at least one of the plurality of RBs or the plurality of slots.

A network entity may be configured to transmit an indication of a CSI-RS configuration for a UE. The CSI-RS configuration may be transmitted to the UE. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The network entity may be configured to transmit the set of CSI-RSs for the UE based on the CSI-RS configuration and the CDM for the set of CSI-RSs. The CDM for the set of CSI-RSs may be associated with at least one of the plurality of RBs or the plurality of slots.

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have a memory and at least one processor coupled to the memory at a user equipment (UE). Based at least in part on information stored in the memory, the at least one processor may be configured to receive an indication of a channel state information (CSI) reference signal (CSI-RS) configuration. The CSI-RS configuration may be received from a network entity. The CSI-RS configuration may include at least one CSI-RS resource block (RB) group associated with code division multiplexing (CDM) for a set of CSI-RSs. The at least one CSI-RS RB group may correspond to at least one of a plurality of RBs in a frequency domain or a plurality of slots in a time domain. Based at least in part on information stored in the memory, the at least one processor may be configured to receive the set of CSI-RSs based on the CSI-RS configuration and the CDM for the set of CSI-RSs. The CDM for the set of CSI-RSs may be associated with at least one of the plurality of RBs or the plurality of slots.

In an aspect of the disclosure, a method, a computer-readable medium, and an apparatus are provided. The apparatus may have a memory and at least one processor coupled to the memory at a network entity. Based at least in part on information stored in the memory, the at least one processor may be configured to transmit an indication of a CSI-RS configuration for a UE. The CSI-RS configuration may be transmitted to the UE. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. Based at least in part on information stored in the memory, the at least one processor may be configured to transmit the set of CSI-RSs for the UE based on the CSI-RS configuration and the CDM for the set of CSI-RSs. The CDM for the set of CSI-RSs may be associated with at least one of the plurality of RBs or the plurality of slots.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
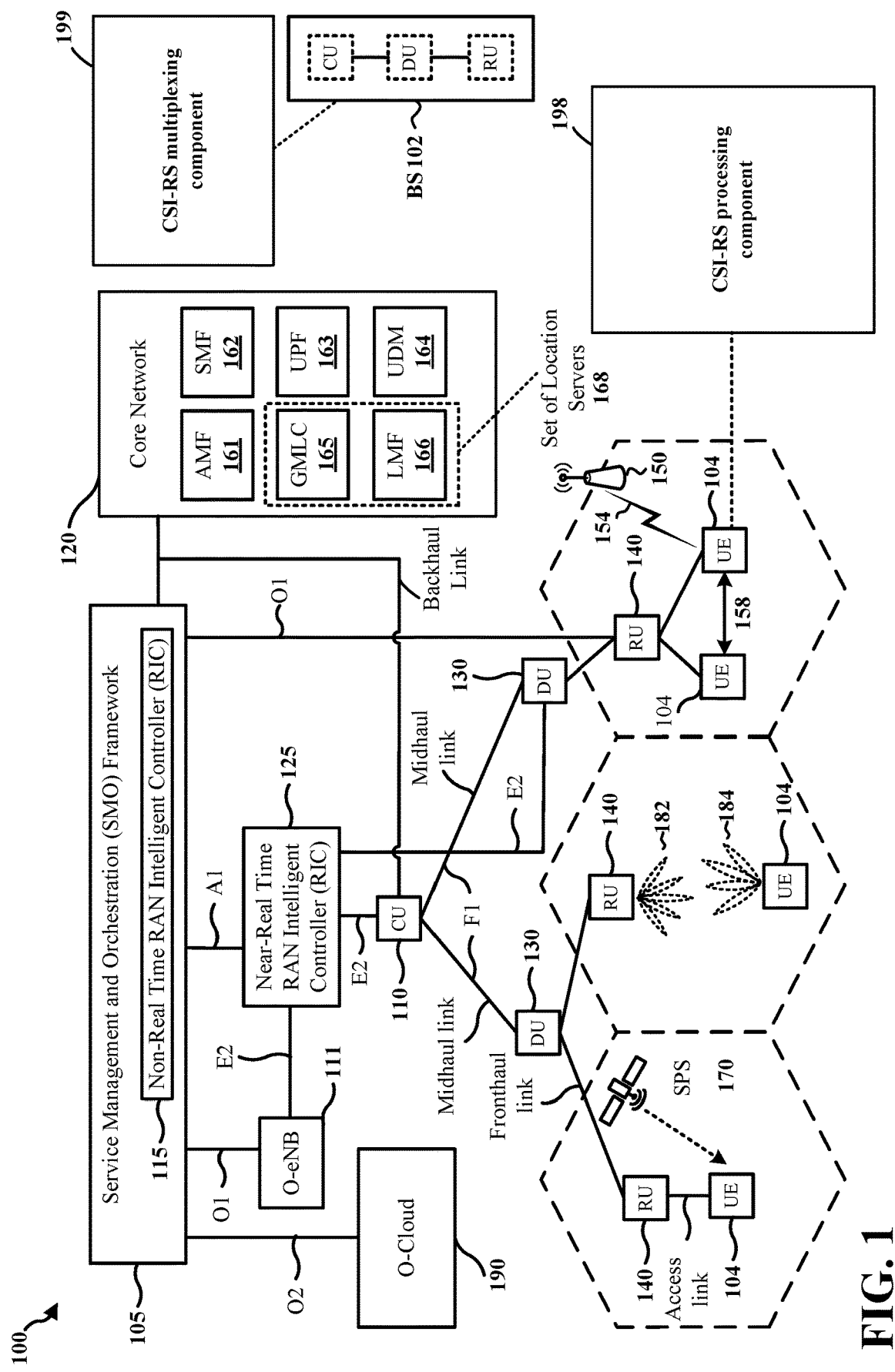
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a CSI-RS processing component 198 configured to receive an indication of a CSI-RS configuration. The CSI-RS configuration may be received from a network entity. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The CSI-RS processing component 198 may be configured to receive the set of CSI-RSs based on the CSI-RS configuration and the CDM for the set of CSI-RSs. The CDM for the set of CSI-RSs may be associated with at least one of the plurality of RBs or the plurality of slots. In certain aspects, the base station 102 may have a CSI-RS multiplexing component 199 may be configured to transmit an indication of a CSI-RS configuration for a UE. The CSI-RS configuration may be transmitted to the UE. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The CSI-RS multiplexing component 199 may be configured to transmit the set of CSI-RSs for the UE based on the CSI-RS configuration and the CDM for the set of CSI-RSs. The CDM for the set of CSI-RSs may be associated with at least one of the plurality of RBs or the plurality of slots. Although the following description may be focused on CSI-RS, the concepts described herein may be applicable to other similar areas, such as any RSs transmitted from one wireless entity to another wireless entity. Although the following description may be focused on 5G NR, the concepts described herein may be applicable to other similar areas, such as LTE, LTE-A, CDMA, GSM, and other wireless technologies.

Figure 2:
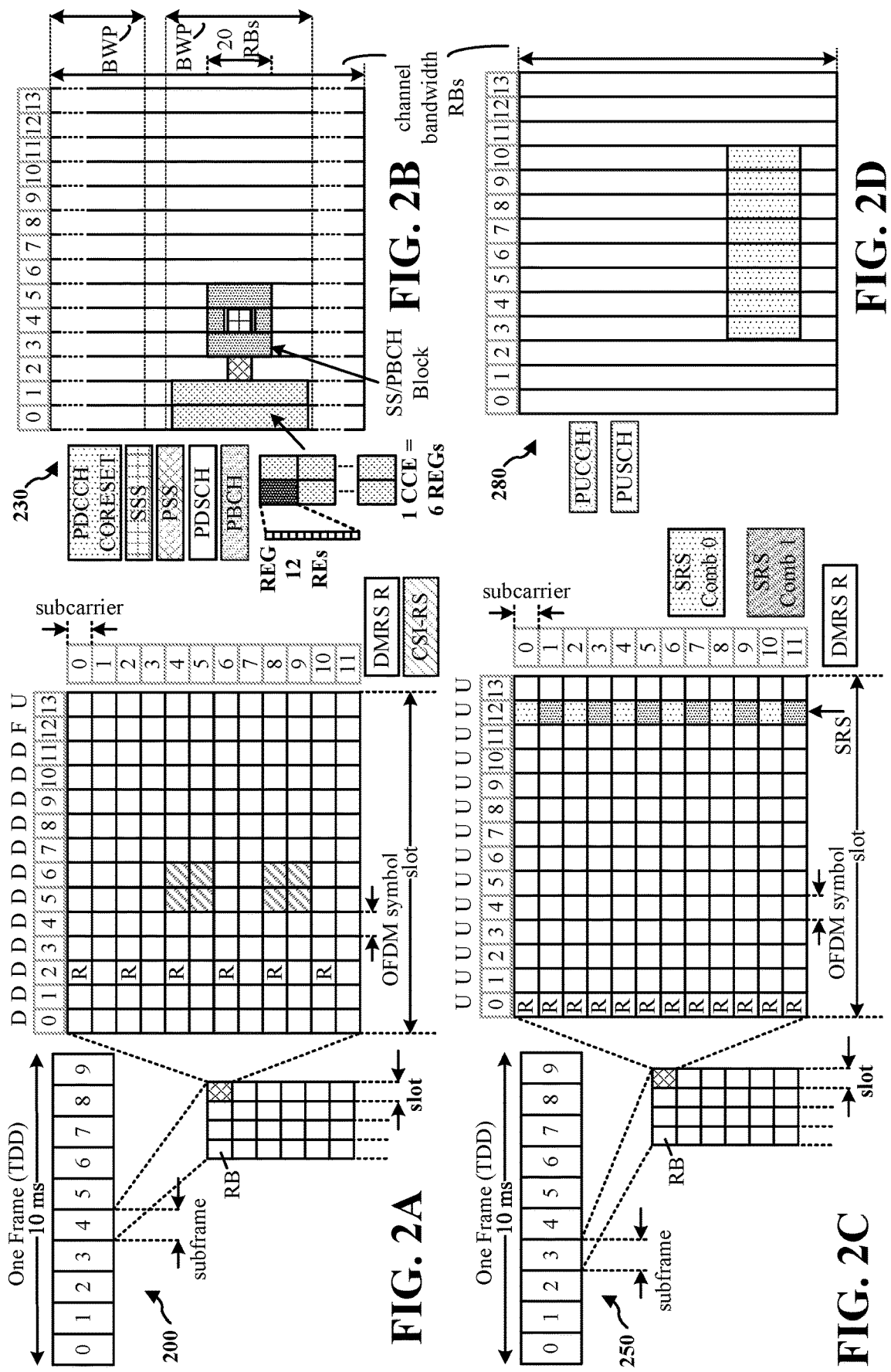
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
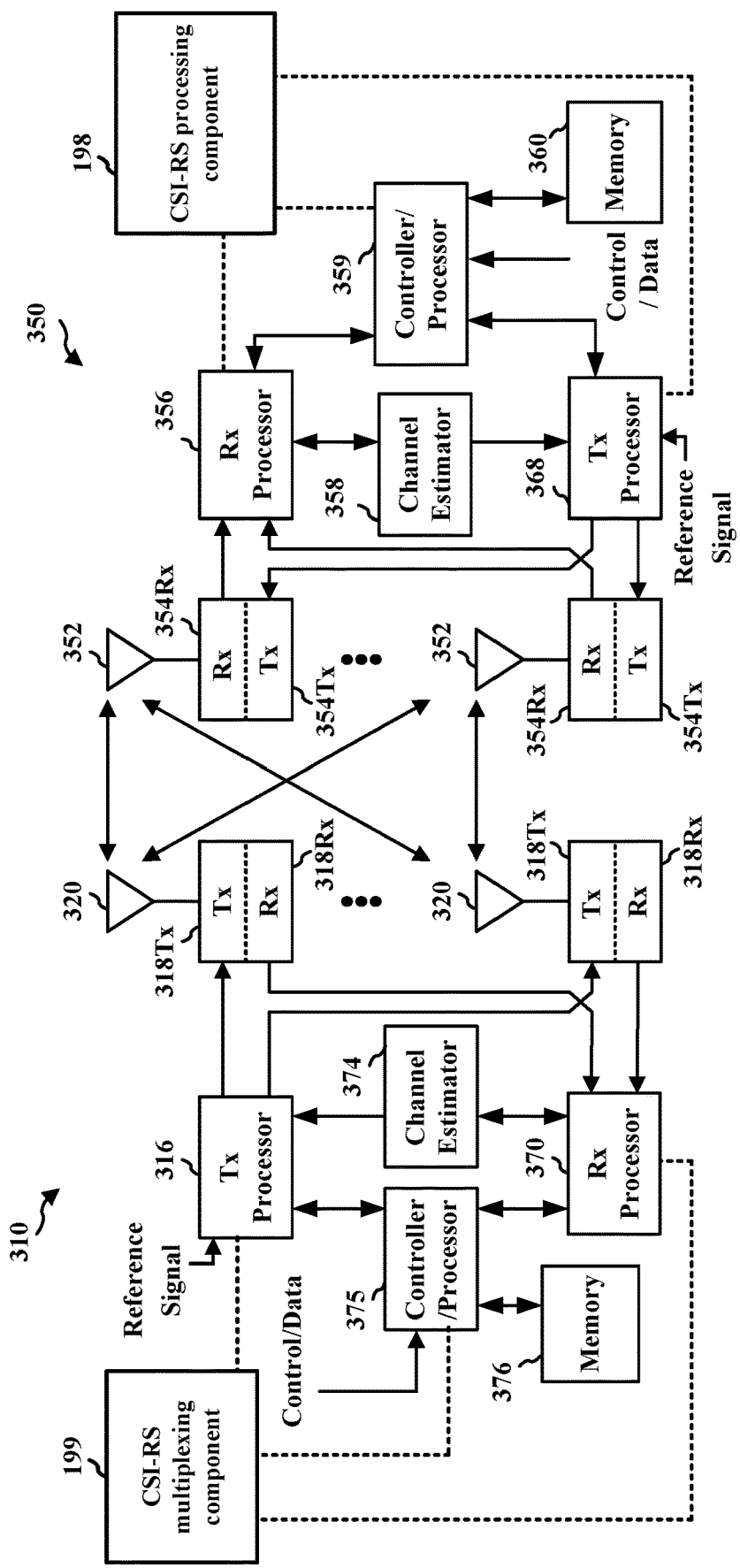
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CSI-RS processing component 198 of FIG. 1.

At least one of the Tx processor 316, the Rx processor 370, and the controller/processor 375 may be configured to perform aspects in connection with the CSI-RS multiplexing component 199 of FIG. 1.

Figure 4:
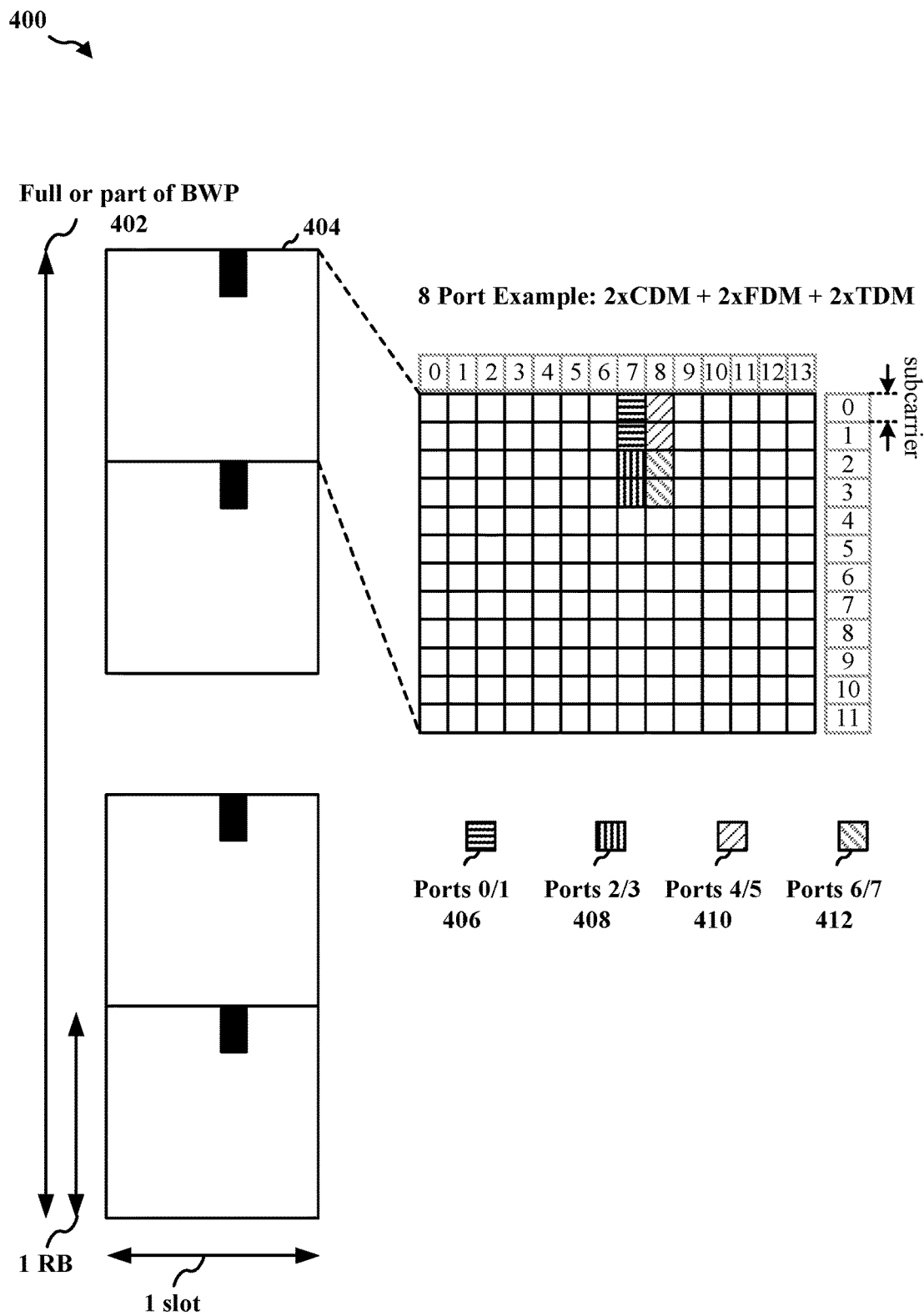
FIG. 4 is a diagram illustrating an example of CSI-RS resource sets in an RB of a full bandwidth part (BWP) or part of a BWP.

FIG. 4 is a diagram 400 illustrating a set of CSI-RSs for an RB of a full or part of a BWP 402. Each set of CSI-RSs may have one or more CSI-RS resources. A CSI-RS resource may have one or more ports, for example 1, 2, 4, 8, 12, 16, 24, or 32 ports. An N-port CSI-RS may occupy N REs within an RB of one slot. An association between a CSI-RS resource and a port may be done in a code domain, then a frequency domain, then a time domain. A set of CSI-RSs may have one or more orthogonal cover codes (OCC), for example a CDM group size of 1, 2, 4, or 8. OCCs in a CDM group may have one or two-dimensional binary Walsh codes. The CDM group size in a frequency domain may be greater or equal to two. The CDM group size in a time domain may be greater or equal to one, such as 1, 2, or 4. A set of CSI-RSs may span a full BWP or a part of a BWP. A set of CSI-RSs with a density of one may repeat every RB in a full BWP or a part of a BWP. A set of CSI-RSs with a density of one-half may repeat every other RB, such as every even RB or every odd RB. A set of CSI-RSs with a density of three may have three tones in an RB. A set of CSI-RSs with a density of three may be used for a tracking reference signal (TRS). A set of CSI-RSs spanning a time domain may repeat every x slots, for example every 4 slots or every 640 slots.

The RB 404 may be represented by a grid of symbols numbered from 0 to 13 and subcarriers numbered from 0 to 11. The RB 404 may have a set of CSI-RSs with a density of one having 8 ports, which may occupy 8 resources within the RB 404. Each CDM group may include two REs spanning two ports. The CDM group 406 may span port 0 and port 1 at symbol 7, subcarrier 0 and symbol 7, subcarrier 1, respectively. The CDM group 408 may span port 2 and port 3 at symbol 7, subcarrier 2 and symbol 7, subcarrier 3, respectively. The CDM group 410 may span port 4 and port 5 at symbol 8, subcarrier 0 and symbol 8, subcarrier 1, respectively. The CDM group 412 may span port 6 and port 7 at symbol 8, subcarrier 2 and symbol 8, subcarrier 3, respectively. The set of CSI-RSs of RB 404 may have 2×CDM, 2×FDM, and 2×TDM, adding up to 8 ports occupying 8 resources within the RB 404. The set of CSI-RSs of RB 404 may have a density of one for the full or part of BWP 402, repeating every RB across the frequency domain of the full or part of BWP 402.

CSI-RS may utilize a considerable amount of overhead resources. For example, if 32 ports are configured for an RS (using 32 REs of an RB), and the CSI-RS repeats every 4 slots, the overhead for CSI-RS may use about 5% of resources. CSI-RS may use even more than 5% of resources if different types of CSI-RS are configured for a UE using the same RBs—each of which may use about 5% of resources in the worst-case scenario. There are many types of CSI-RS, such as TRS and non-zero power (NZP) CSI-RS (NZP-CSI-RS) for CSI, NZP-CSI-RS for broadcast multicast (BM), zero power (ZP) CSI-RS (ZP-CSI-RS), and CSI interference measurement (CSI-IM).

CSI-RS that may be multiplexed across a greater number of UEs may reduce the overhead resources. A CDM group size may be limited to two in order to preserve orthogonality. For example, a CDM group size of four ports may have a frequency difference between the first RE and the last RE that is above a coherence bandwidth, which may cause a UE to be unable to differentiate between ports. While a CDM group size of two in a frequency domain may be optimal for mitigating the loss of orthogonality in a frequency selective channel, limiting a CDM group size to two may limit the frequency domain REs that may be CDMed to be confined to a single RB. In other words, OCC for CSI-RS confined to a single RB may lead to a limited number of ports that may be multiplexed.

UEs that have a direct line of sight (LOS) to a network entity transceiver (e.g., a TRP) may use higher bands and/or narrower beams, which may minimize the delay spread of the channel. More antennas may be able to squeezed into the same footprint area. In other words, UEs that have a direct LOS to a network entity transceiver may use one or more focused beams with a wide coherence bandwidth, allowing for OCC to span across RBs. This may increase the number of UEs that may be multiplexed with a set of CSI-RS, reducing overhead. UEs that are stationary may have low Doppler effects, allowing for OCC to span across slots, which may also increase the number of UEs that may be multiplexed with a set of CSI-RS. While such UEs may be able to handle a set of CSI-RSs that span RBs in both a frequency domain or a time domain, UEs with greater Doppler effects may not be able to handle a set of CSI-RSs that span RBs in a time domain, and UEs with a smaller coherence bandwidth may not be able to handle a set of CSI-RSs that span RBs in a frequency domain. A CSI-RS resource multiplexing system may dynamically configure CSI-RS to optimize CSI-RS resource utilization for UEs having greater or lower coherence bandwidth and greater or lower coherence time.

A UE may be configured to receive an indication of a CSI-RS configuration. The CSI-RS configuration may be received from a network entity. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The UE may be configured to receive the set of CSI-RSs based on the CSI-RS configuration and the CDM for the set of CSI-RSs. The CDM for the set of CSI-RSs may be associated with at least one of the plurality of RBs or the plurality of slots.

A network entity may be configured to transmit an indication of a CSI-RS configuration for a UE. The CSI-RS configuration may be transmitted to the UE. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The network entity may be configured to transmit the set of CSI-RSs for the UE based on the CSI-RS configuration and the CDM for the set of CSI-RSs. The CDM for the set of CSI-RSs may be associated with at least one of the plurality of RBs or the plurality of slots.

Figure 5:
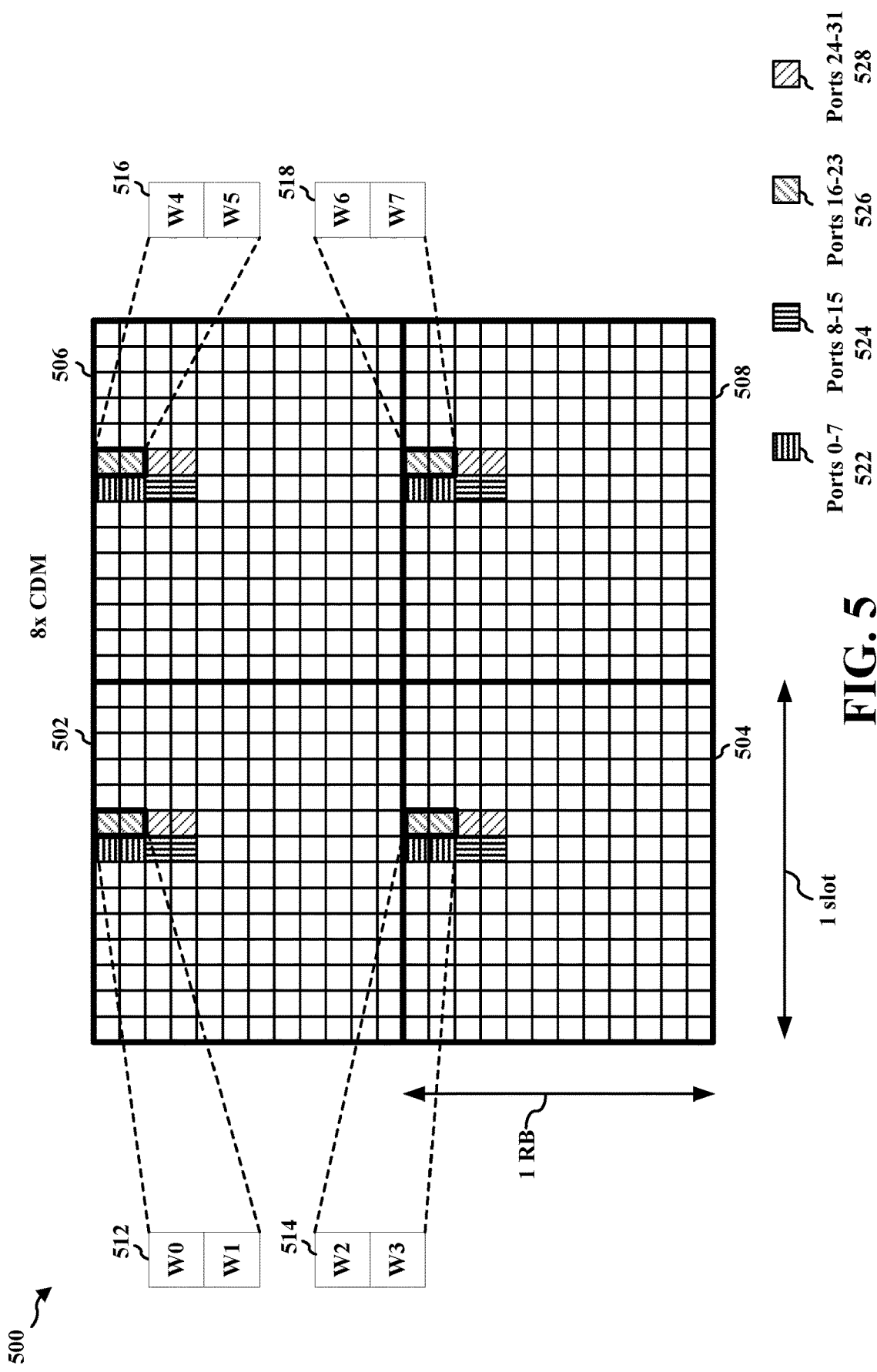
FIG. 5 is a diagram illustrating an example of CSI-RS resource sets that span RBs in the frequency domain and slots in the time domain.

FIG. 5 is a diagram 500 illustrating an example of a set of CSI-RSs that may span RBs in the frequency domain and slots in the time domain. The RB 502 may be in a different component carrier (CC) than the RB 504. A CDM group of a set of CSI-RSs configured to span more than one RB in a frequency domain and/or more than one slot in a time domain may be referred to as a CSI-RS RB group. The RBs 502, 504, 506, and 508 may have a CSI-RS RB group of two RBs and two slots with 8×CDM. For example, the CSI-RS RB group 526 may span ports 16-23 across the RBs 502, 504, 506, and 508. In RB 502, the CSI-RS resource 512 may have REs W0 and W1. In RB 504, the CSI-RS resource 514 may have REs W2 and W3. In RB 506, the CSI-RS resource 516 may have REs W4 and W5. In RB 508, the CSI-RS resource 518 may have REs W6 and W7. REs W0-W7 may be a cover assigned to ports 16-23 of the CSI-RS RB group 526. Similar REs may be assigned to ports 0-7 of the CSI-RS RB group 522, ports 8-15 of the CSI-RS RB group 524, and ports 24-31 of the CSI-RS RB group 528. The CSI-RS RB group is located in a first RE location (symbols 7-8 and subcarriers 0-3) of the RB 502 and the CSI-RS RB group is located in a second RE location (symbols 7-8 and subcarriers 0-3) of the RB 504. The first RE location (symbols 7-8 and subcarriers 0-3) is the same as the second RE location (symbols 7-8 and subcarriers 0-3) Such a configuration may increase the number of ports from 8 in FIG. 4 to 32 in FIG. 5. While such a configuration may be appropriate for UEs having a high coherence bandwidth and a high coherence time (e.g., a stationary UE with a direct LOS to a network entity transmitter), such a configuration may not be appropriate for UEs having a low coherence bandwidth or a low coherence time.

Figure 6:
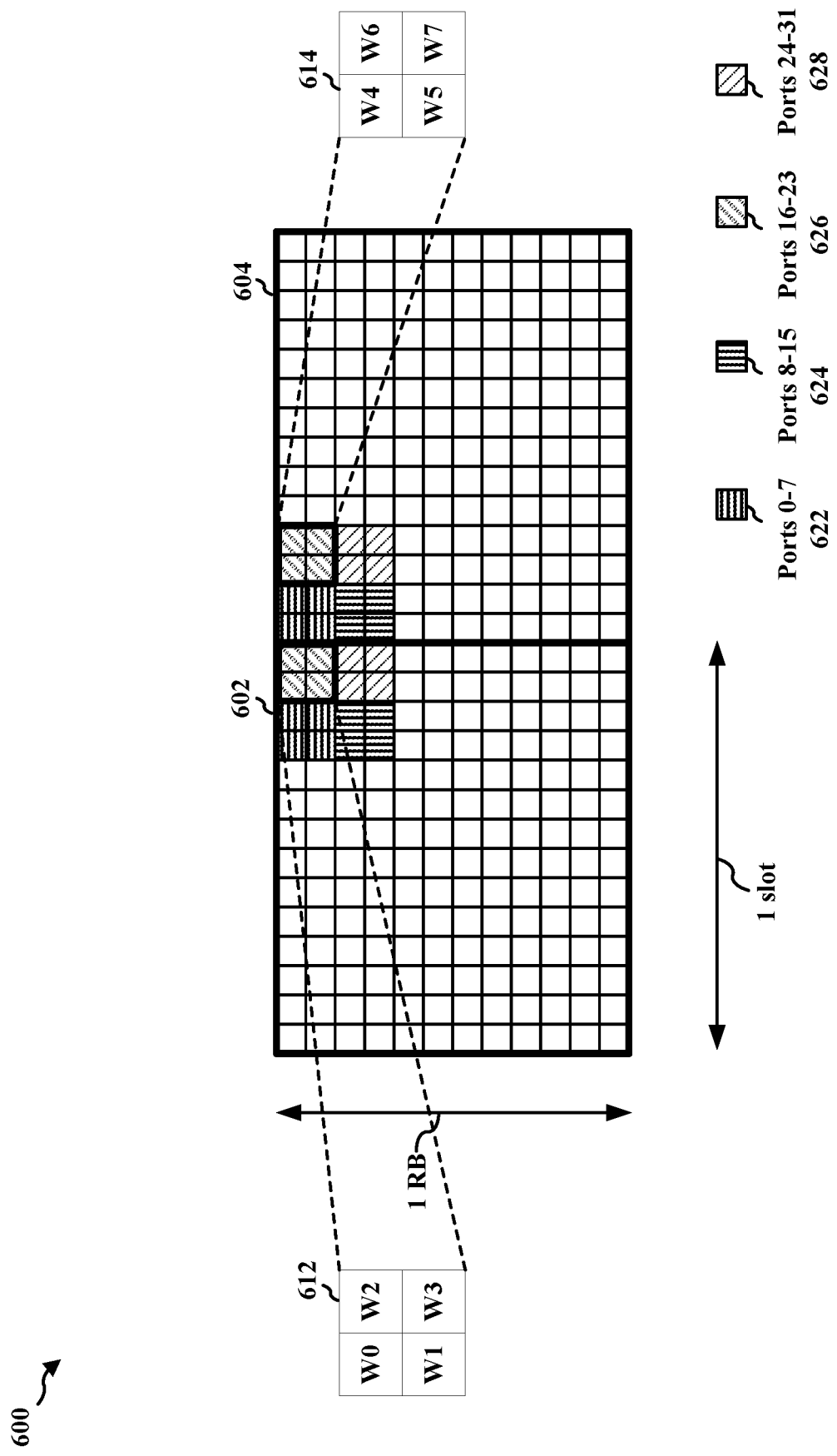
FIG. 6 is a diagram illustrating an example of CSI-RS resource sets that span slots in the time domain located in different RE locations relative to one another.

FIG. 6 is a diagram 600 illustrating an example of a set of CSI-RSs that may span slots in a time domain. While the RE locations used for a CSI-RS RB group may be the same in all RBs, the RE locations used for a CSI-RS RB group may be different per RB in a CSI-RS RB group. For example, the RE locations used for a CSI-RS RB group may be located closer to one another to reduce the coherence time. An RE location may refer to a symbol/subcarrier coordinate system common to RBs that span a frequency domain or a time domain, such as the grid of symbols and subcarriers of RB 404 in FIG. 4. The RBs 602 and 604 in FIG. 6 may have a CSI-RS RB group of one RB and two slots with 8×CDM. For example, the CSI-RS RB group 626 may span ports 16-23 across the RBs 602 and 604. In RB 602, the CSI-RS resource 612 may have REs W0, W1, W2, and W3. In RB 604, the CSI-RS resource 614 may have REs W4, W5, W6, and W7. REs W0-W7 may be a cover assigned to ports 0-7 of the CSI-RS RB group 626. Similar REs may be assigned to ports 0-7 of the CSI-RS RB group 622, ports 8-15 of the CSI-RS RB group 624, and ports 24-31 of the CSI-RS RB group 628. The CSI-RS RB group is located in a first RE location (symbols 10-13 and subcarriers 0-3) of the RB 602 and the CSI-RS RB group is located in a second RE location (symbols 0-3 and subcarriers 0-3) of the RB 604. The first RE location (symbols 10-13 and subcarriers 0-3) is different from the second RE location (symbols 0-3 and subcarriers 0-3). Such a configuration may increase the number of ports from 8 in FIG. 4 to 32 in FIG. 6, and may reduce the coherence time to support a UE moving at a faster speed (i.e., with a higher Doppler effect). While such a configuration may be appropriate for UEs having a low coherence time (e.g., a moving UE), such a configuration may not be appropriate for UEs moving at speeds that reduce the coherence time to break the orthogonality of the CSI-RS RB group.

Figure 7:
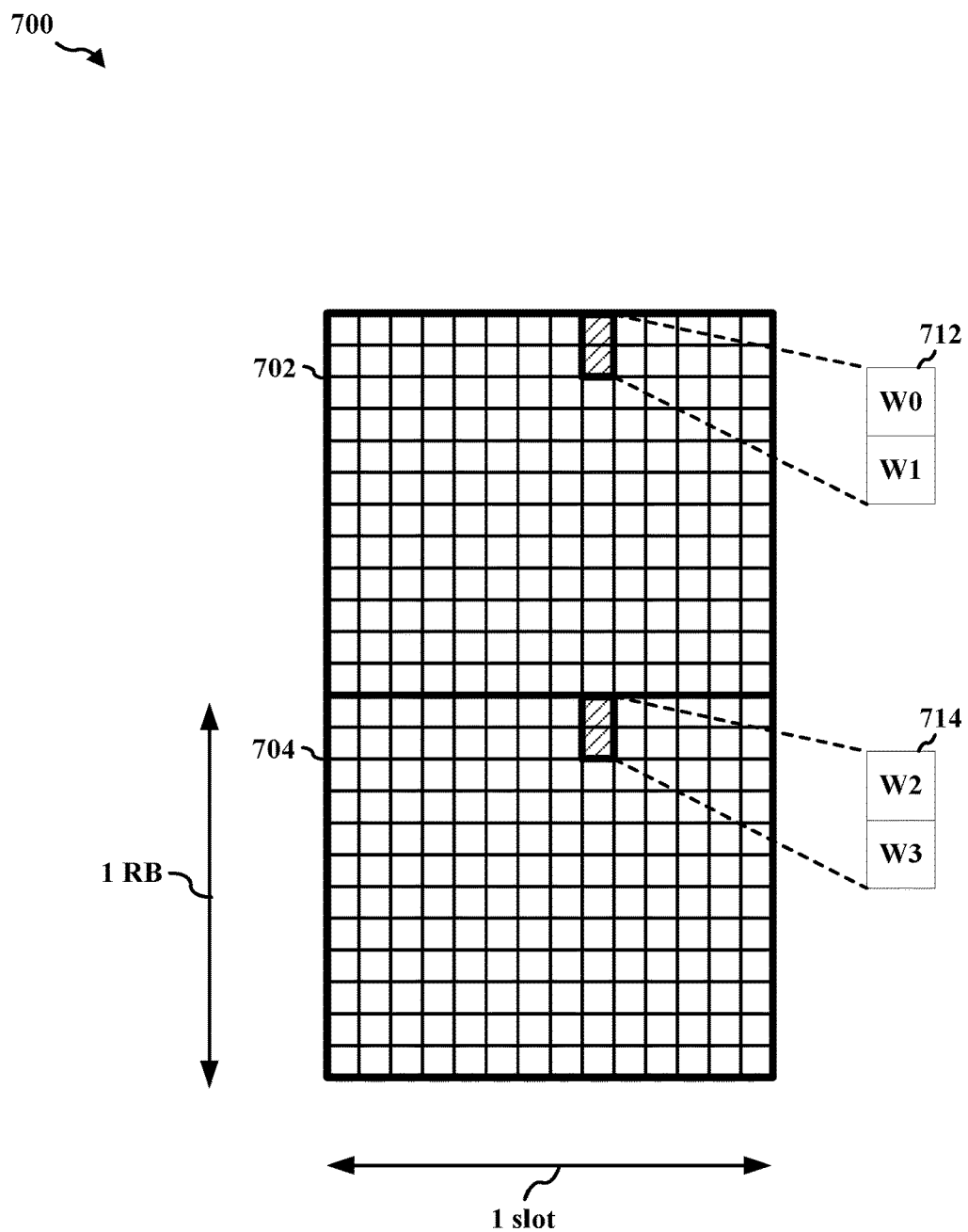
FIG. 7 is a diagram illustrating an example of CSI-RS resource sets that span RBs in the frequency domain that may be shared by different UEs having different CSI-RS configurations.

FIG. 7 is a diagram 700 illustrating an example of CSI-RS resource sets that span RBs in the frequency domain that may be shared by different UEs having different CSI-RS configurations. This may be made possible since the Walsh OCC code may be nested for different sizes. The RBs 702 and 704 in FIG. 7 may have a set of CSI-RSs that span two RB and one slot. In RB 702, the CSI-RS resource 712 may have REs W0 and W1. In RB 704, the CSI-RS resource 714 may have REs W4 and W5. REs W0-W4 may be a cover that may be assigned to one set of ports for a first UE and a second set of ports for a second UE.

For example, a first UE may be configured with 4 ports with 4×CDM. In other words, the first UE may be configured to have a set of CSI-RSs that are repeated in every 2 RBs and 1 slot. The CSI-RS RB group may have a size of two. The first UE may have an OCC represented by:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

where each column $$\begin{bmatrix} W0 \\ W1 \\ W2 \\ W3 \end{bmatrix}$$

is a port

Meanwhile, a second UE may be configured with 2 ports with 2×CDM. In other words, the second UE may be configured to have a set of CSI-RSs that are repeated in every RB. The CSI-RS RB group may have a size of one. The second UE may have an OCC represented by:

$$\begin{bmatrix} 1 & 1 \\ 1 & -1 \end{bmatrix}$$

where each column $$\begin{bmatrix} W0 \\ W1 \end{bmatrix} = \begin{bmatrix} W2 \\ W3 \end{bmatrix}$$

With such a configuration, the first two ports may be shared between the first UE and the second UE while the rest of the ports may be used by the first UE. In other words, the first UE and the second UE may use the same REs and the same cover W0-W4, but may have different CSI-RS configurations with different ports, CDM, and CSI-RS RB group sizes.

Figure 8:
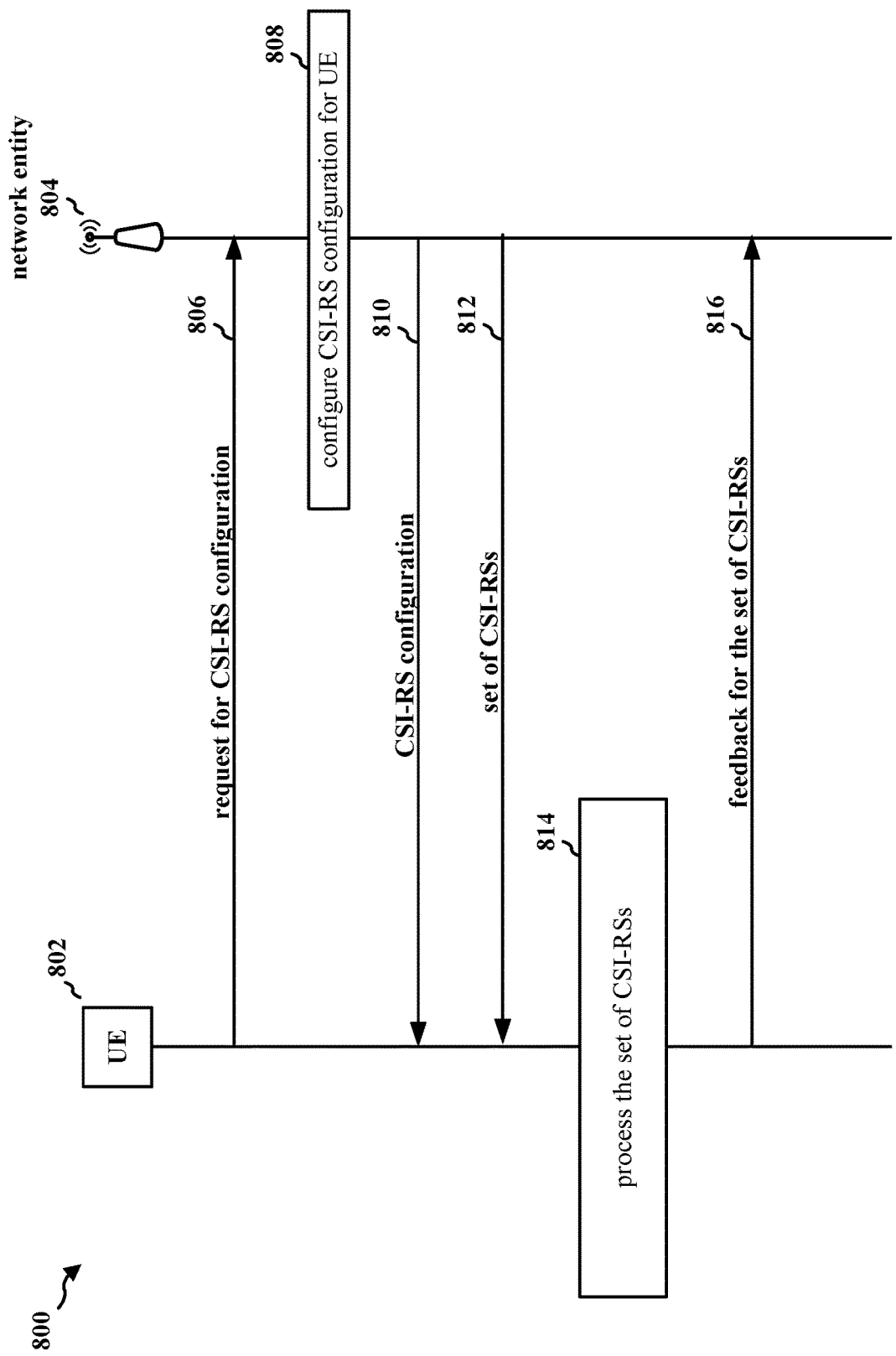
FIG. 8 is a communication flow diagram illustrating an example of a UE and a network entity configured to utilize CSI-RS resources multiplexed over frequency domains and/or time domains.

FIG. 8 is a communication flow diagram 800 that illustrates an example of a UE 802 and a network entity 804 configured to utilize CSI-RS resources multiplexed over RBs in a frequency domain and/or over slots in a time domain.

The UE 802 may transmit a request 806 for CSI-RS configuration to the network entity 804. The request 806 for CSI-RS configuration may include a maximum number of frequency domain RBs and a maximum number of time domain slots for a CDM to span. In one aspect, in response to the UE 802 determining that its coherence bandwidth is equal or greater than a coherence bandwidth threshold, and that its coherence time is equal or greater than a coherence time threshold, the UE 802 may transmit a request to the network entity 804 to use a CSI-RS configuration having at least one CSI-RS RB group that may correspond to a plurality of RBs in a frequency domain and a plurality of slots in a time domain. In one aspect, in response to the UE determining that its coherence bandwidth is equal or greater than a coherence bandwidth threshold the UE may transmit a request to the network entity 804 to use a CSI-RS configuration having at least one CSI-RS RB group that may correspond to a plurality of RBs in a frequency domain. In one aspect, in response to the UE determining that its coherence time is equal or greater than a coherence time threshold the UE may transmit a request to the network entity 804 to use a CSI-RS configuration having at least one CSI-RS RB group that may correspond to a plurality of slots in a time domain. In one aspect, the request may include an indication of the UE's coherence time or an indication of the UE's coherence bandwidth to allow the network entity 804 to determine the type of CSI-RS configuration to use.

The UE 802 may determine its coherence bandwidth and/or its coherence time in any suitable manner, for example by determining its speed and/or by determining whether it has a LOS to a transceiver (e.g., a TRP) of the network entity 804. In one aspect, in response to the UE 802 determining that it is stationary and has a LOS to a transceiver of the network entity, the UE 802 may transmit a request 806 for CSI-RS configuration to the network entity 804 for a CSI-RS configuration having a CSI-RS RB group that corresponds to a plurality of RBs in a frequency domain and a plurality of slots in a time domain. In other words, the UE 802 may determine that its coherence bandwidth and its coherence time is large enough to support a CSI-RS configuration having a CSI-RS RB group that corresponds to a plurality of RBs in a frequency domain and a plurality of slots in a time domain, such as the CSI-RS RB group in RBs 502, 504, 506, and 508 in FIG. 5.

In another aspect, in response to the UE 802 determining that its Doppler has increased, decreasing its coherence time, the UE 802 may transmit a request 806 for CSI-RS configuration to the network entity 804 for a CSI-RS configuration having a CSI-RS RB group that corresponds to a plurality of slots in a time domain with different RE locations for each slot to decrease a coherence time for the CSI-RS RB group. In other words, the UE 802 may determine that its coherence time is equal to or smaller than a first coherence time threshold, but is equal to or larger than a second coherence time threshold, and may request a CSI-RS configuration having a CSI-RS RB group that corresponds to a plurality of slots in a time domain with different RE locations for each slot to decrease a coherence time for the CSI-RS RB group, such as the CSI-RS RB group in RBs 602 and 604 in FIG. 6.

In another aspect, in response to the UE 802 determining that it is in an area (e.g., a building such as a mall) that blocks a direct LOS to a transceiver of the network entity 804, the UE 802 may transmit a request 806 for CSI-RS configuration to the network entity 804 for a CSI-RS configuration having a CDM group that is restricted to a single RB. In other words, the UE 802 may determine that its coherence bandwidth is equal to or smaller than a coherence bandwidth threshold, and may request a CSI-RS configuration having a CDM group that is restricted to a single RB, such as the CDM group 406, CDM group 408, CDM group 410, and CDM group 412 in FIG. 4.

The network entity 804 may obtain the request 806 for CSI-RS configuration from the UE 802. The network entity 804 may obtain a plurality of requests from a plurality of UEs, including the UE 802. At 808, the network entity 804 may configure the CSI-RS configuration for the UE 802 based on the request 806 for CSI-RS configuration from the UE 802. The network entity 804 may configure the CSI-RS configuration for the UE 802 based on a plurality of requests from a plurality of UEs, including the request 806 for CSI-RS configuration from the UE 802. In some aspects, the network entity 804 may determine that the UE has a coherence bandwidth that is equal or greater than a coherence bandwidth threshold, and/or has a coherence time that is equal or greater than a coherence time threshold based on an indication of the UE's coherence time or an indication of the UE's coherence bandwidth. Such an indication may be a metric of the UE's coherence time (e.g., milliseconds) and/or coherence bandwidth (e.g., MHz), or may be a metric that the network entity 804 may use to determine the UE's coherence time (e.g., a position, speed, or a Doppler effect) and/or coherence bandwidth (e.g., a delay spread). In some aspects, the network entity 804 may determine the UE has a coherence bandwidth that is equal or greater than a coherence bandwidth threshold, and/or has a coherence time that is equal or greater than a coherence time threshold based on a determination of an attribute of the UE 802. For example, the network entity 804 may determine that the UE 802 is moving via a detected Doppler effect or a first position of the UE 802 at a first time relative to a second position of the UE 802 at a second time from an LMF, or may determine that the UE 802 does not have a direct LOS to a transceiver of the network entity 804 via a detected delay spread. In some aspects, the network entity 804 may configure a plurality of CSI-RS resources for different UEs for the same CSI-RS RB group, such as the CSI-RS RB group in FIG. 7.

The network entity 804 may output a CSI-RS configuration 810 to the UE 802. The CSI-RS configuration may include a configuration of a number of frequency domain RBs and a number of time domain slots the CDM spans may be. The network entity 804 may output the CSI-RS configuration 810 as an RRC that statically or semi-statically configures CSI-RS for the UE 802. The network entity 804 may output the CSI-RS configuration 810 as DCI or a medium access control (MAC) control element (MAC-CE) that dynamically configures CSI-RS for the UE 802. The CSI-RS configuration 810 may be an update to a previous CSI-RS configuration that changes a portion of the previous CSI-RS configuration, preserving the previous configuration in part.

The UE 802 may receive the CSI-RS configuration 810 so that it knows how to process the set of CSI-RSs 812. The network entity 804 may output the set of CSI-RSs 812 to the UE 802. The UE 802 may receive the set of CSI-RSs 812 from the network entity 804. At 814, the UE 802 may process the set of CSI-RSs. CSI-RSs received from the network entity 804 may be processed in any suitable manner. In one aspect, the UE 802 may measure a reference signal received power (RSRP) or a signal-to-interference plus noise ratio (SINR) of the set of CSI-RSs 812. In one aspect, the UE 802 may measure or estimate one or more channels based on the set of CSI-RSs 812. For example, the UE 802 may determine a CQI, a PMI, an RI, or a HARQ-ACK based on the set of CSI-RSs 812. In one aspect, the UE 802 may estimate or track a TRS based on the set of CSI-RSs 812, where the set of CSI-RSs may include one or more TRSs. For example, the UE 802 may estimate timing, frequency, or Doppler of the network entity 804 based on the set of CSI-RSs 812. The timing or the frequency may be estimated after the set of CSI-RSs 812 is received. In one aspect, the UE 802 may measure interference on the REs of the set of CSI-RSs (i.e., perform interference estimation) to determine a CSI-IM. The interference estimation may be performed after the set of CSI-RSs 812 is received. In one aspect, the UE 802 may perform rate matching on the set of CSI-RSs 812, where the set of CSI-RSs may include one or more ZP-CSI-RSs. The UE 802 may rate match at least one downlink channel or signal based on the set of CSI-RSs 812. The at least one downlink channel or signal may be rate matched after the set of CSI-RSs is received by the UE 802. In one aspect, the UE 802 may perform a beam management procedure based on the set of CSI-RSs 812. The beam management procedure may be performed after the set of CSI-RSs 812 is received by the UE 802.

The UE 802 may transmit feedback 816 for the set of CSI-RSs to the network entity 804 in response to processing the set of CSI-RSs 812 at 814. In one aspect, the UE 802 may perform at least one measurement for the set of CSI-RSs. The at least one measurement may be performed after the set of CSI-RSs 812 is received. The at least one measurement may be an RSRP measurement or an SINR measurement. In one aspect, the UE 802 may transmit a report of at least one RSRP measurement or at least one SINR measurement to the network entity 804. The report may be transmitted after the at least one measurement of the RSRP or the SINR is performed. In one aspect, the UE 802 may transmit channel state (CS) feedback to the network entity 804. The CS feedback may be transmitted after the set of CSI-RSs 812 are received by the UE 802.

Figure 9:
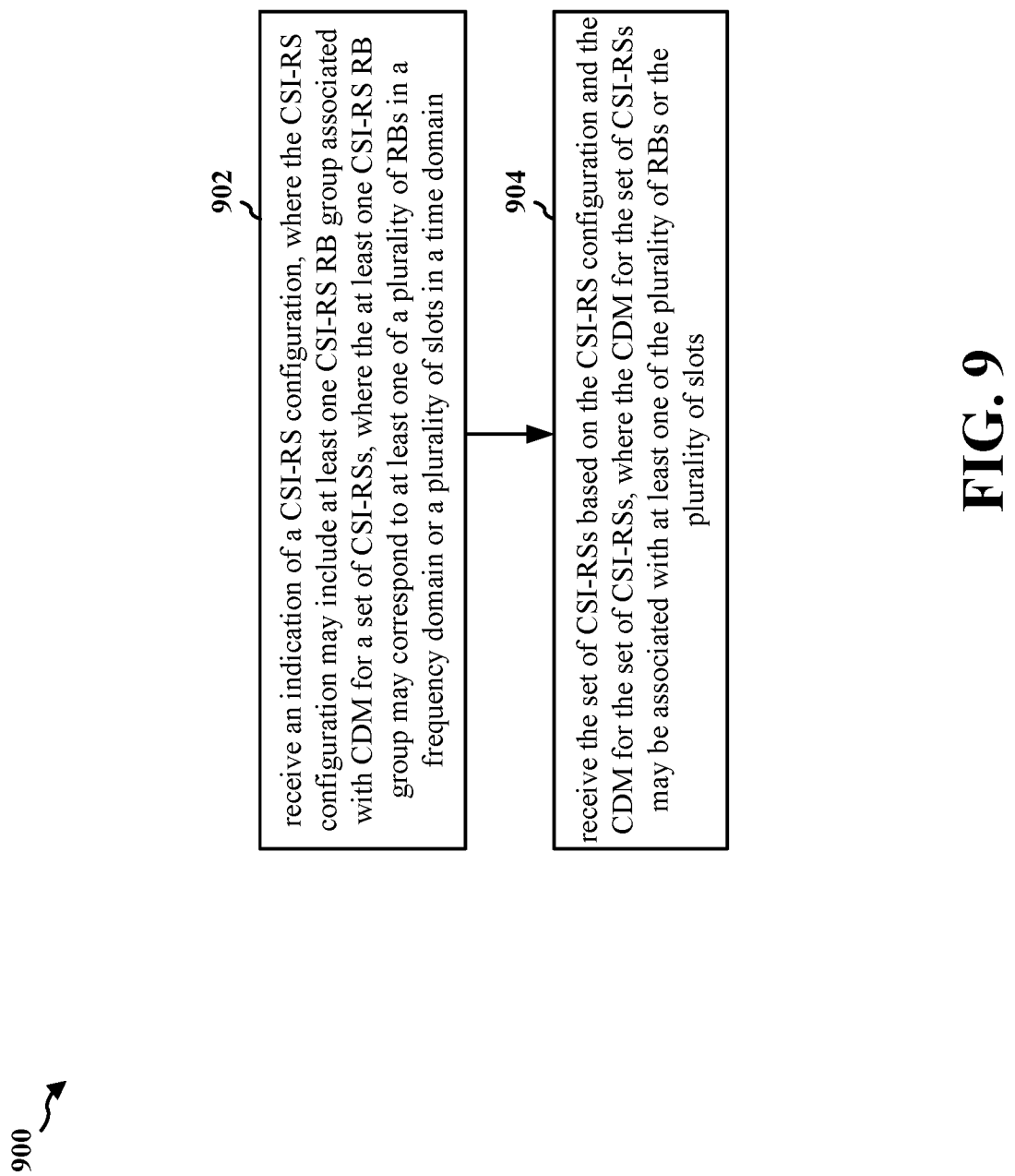
FIG. 9 is a flowchart of a method of wireless communication.

FIG. 9 is a flowchart 900 of a method of wireless communication. The method may be performed by a UE (e.g., the UE 104, the UE 350, the UE 802; the apparatus 1104). At 902, the UE may receive an indication of a CSI-RS configuration. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. For example, 902 may be performed by the UE 802 in FIG. 8, which may receive in indication of a CSI-RS configuration 810 from the network entity 804. The CSI-RS configuration 810 may include at least one CSI-RS RB group associated with CDM for a set of CSI-RSs, such as the CSI-RS RB group in RBs 502, 504, 506, and 508 in FIG. 5. The at least one CSI-RS RB group may correspond to at least one of a plurality of RBs in a frequency domain, such as RB 502 and RB 504, or a plurality of slots in a time domain, such as the slot of RB 502 and the slot of RB 506. The at least one CSI-RS group. Moreover, 902 may be performed by the component 198 of the apparatus 1104 in FIG. 11.

At 904, the UE may receive the set of CSI-RSs based on the CSI-RS configuration and the CDM for the set of CSI-RSs. The CDM for the set of CSI-RSs may be associated with at least one of the plurality of RBs or the plurality of slots. For example, 904 may be performed by the UE 802 in FIG. 8, which may receive the set of CSI-RSs 812 based on the CSI-RS configuration 810 and the CDM for the set of CSI-RSs from the network entity 804. The CDM for the set of CSI-RSs may be associated with at least one of the plurality of RBs, such as RB 502 and RB 504 in FIG. 5, or the plurality of slots, such as the slot of RB 502 and the slot of RB 506. Moreover, 904 may be performed by the component 198 of the apparatus 1104 in FIG. 11.

Figure 10:
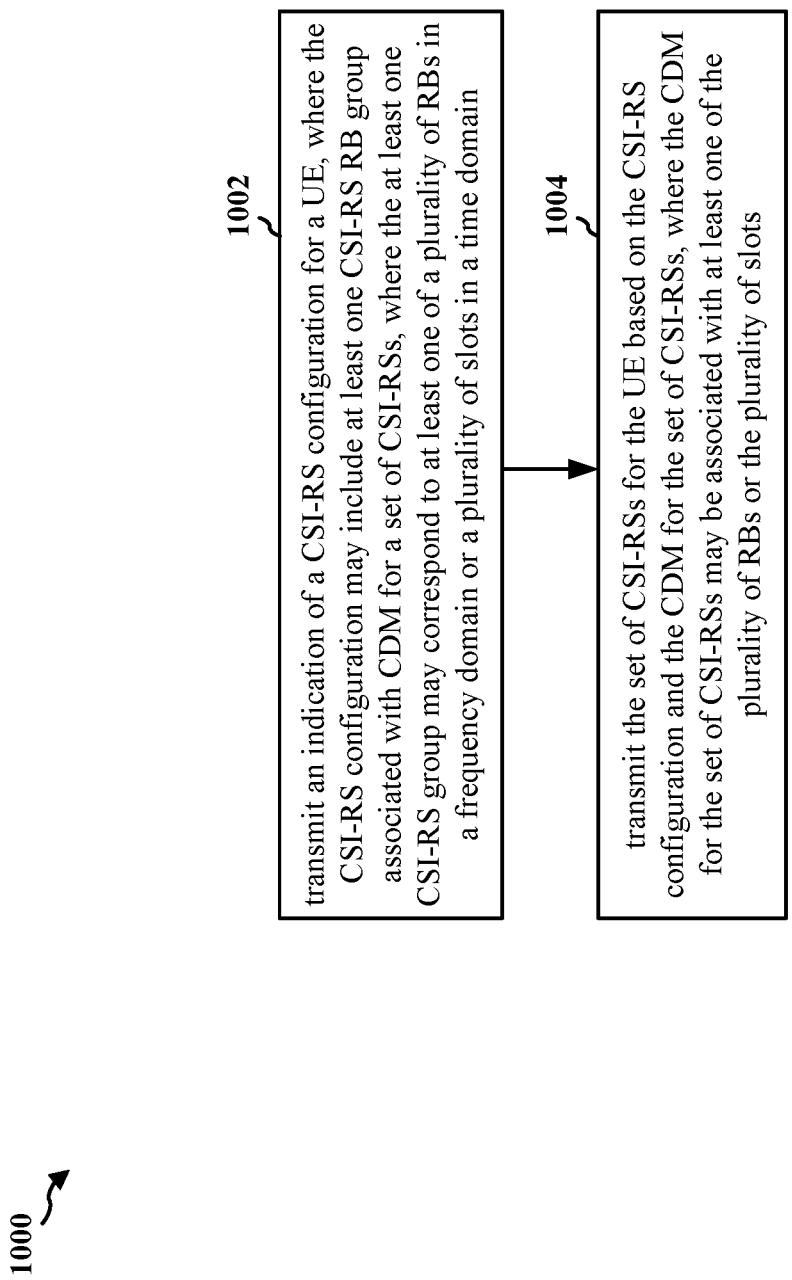
FIG. 10 is another flowchart of a method of wireless communication.

FIG. 10 is a flowchart 1000 of a method of wireless communication. The method may be performed by a network entity (e.g., the base station 102, the base station 310; the network entity 804; the network entity 1102, the network entity 1202). At 1002, the network entity may transmit an indication of a CSI-RS configuration for a UE. The CSI-RS configuration may include at least one CSI-RS RB group associated with CDM for a set of CSI-RSs. The at least one CSI-RS group may correspond to at least one of a plurality of RBs in a frequency domain or a plurality of slots in a time domain. For example, 1002 may be performed by the network entity 804 in FIG. 8, which may transmit an indication of a CSI-RS configuration 810 for the UE 802. The CSI-RS configuration may include at least one CSI-RS RB group associated with CDM from a set of CSI-RSs, such as the CSI-RS RB group in RBs 502, 504, 506, and 508 in FIG. 5. The at least one CSI-RS group may correspond to at least one of a plurality of RBs in a frequency domain, such as RB 502 and RB 504, or a plurality of slots in a time domain, such as the slot of RB 502 and the slot of RB 506. Moreover, 1002 may be performed by the component 199 of the network entity 1202 in FIG. 12.

At 1004, the network entity may transmit the set of CSI-RSs for the UE based on the CSI-RS configuration and the CDM for the set of CSI-RSs. The CDM for the set of CSI-RSs may be associated with at least one of the plurality of RBs or the plurality of slots. For example, 1004 may be performed by the network entity 804 in FIG. 8, which may transmit the set of CSI-RSs 812 for the UE 802 based on the CSI-RS configuration 810 and the CDM for the set of CSI-RSs 812. The CDM for the set of CSI-RSs may be associated with at least one of the plurality of RBs, such as RB 502 and RB 504, or the plurality of slots, such as the slot of RB 502 and the slot of RB 506. Moreover, 1004 may be performed by the component 199 of the network entity 1202 in FIG. 12.

Figure 11:
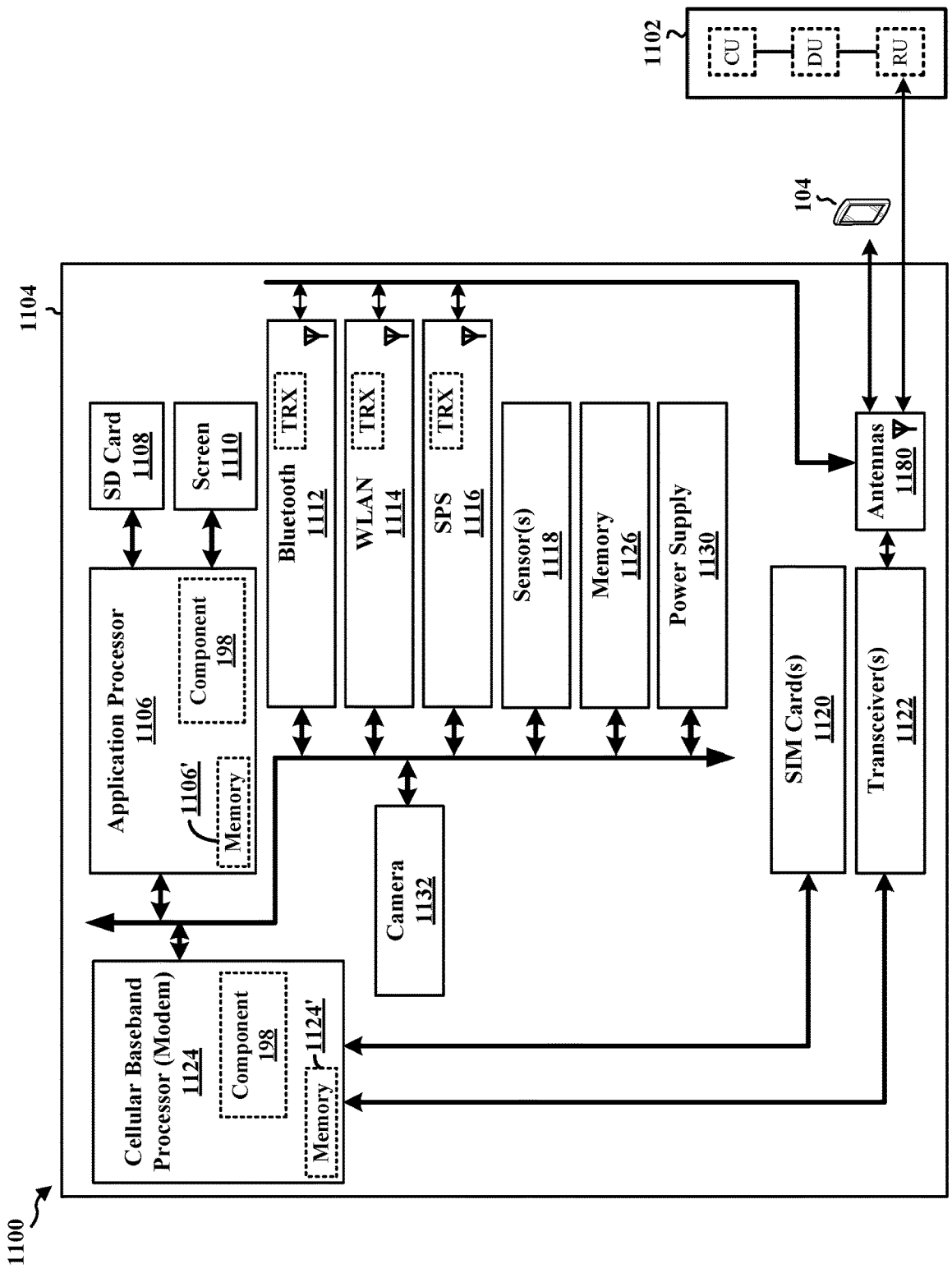
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (Rx)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the Tx processor 368, the Rx processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 may be configured to receive an indication of a CSI-RS configuration. The CSI-RS configuration may be received from a network entity. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The component 198 may be configured to receive the set of CSI-RSs based on the CSI-RS configuration and the CDM for the set of CSI-RSs. The CDM for the set of CSI-RSs may be associated with at least one of the plurality of RBs or the plurality of slots. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for receiving an indication of a CSI-RS configuration. The CSI-RS configuration may be received from a network entity. The apparatus 1104 may include means for receiving the set of CSI-RSs based on the CSI-RS configuration and the CDM for the set of CSI-RSs. The apparatus 1104 may include means for receiving a second indication of an update to the CSI-RS configuration. The apparatus 1104 may include means for performing at least one measurement for the set of CSI-RSs. The apparatus 1104 may include means for transmitting a report of the at least one measurement for the set of CSI-RSs. The report may be transmitted after the at least one measurement is performed. The apparatus 1104 may include means for transmitting CS feedback based on the set of CSI-RSs. The CS feedback may be transmitted after the set of CSI-RSs is received. The apparatus 1104 may include means for estimating a timing or frequency of a network entity based on the set of CSI-RSs. The timing or the frequency may be estimated after the set of CSI-RSs is received. The apparatus 1104 may include means for performing at least one interference estimation based on the set of CSI-RSs. The at least one interference estimation may be performed after the set of CSI-RSs is received. The apparatus 1104 may include means for matching at least one downlink channel or signal based on the set of CSI-RSs. The at least one downlink channel or signal may be rate matched after the set of CSI-RSs is received. The apparatus 1104 may include means for performing a beam management procedure based on the set of CSI-RSs. The beam management procedure may be performed after the set of CSI-RSs is received. The apparatus 1104 may include means for transmitting a request for the CSI-RS configuration to include at least one CSI-RS RB group corresponding with at least one of the plurality of RBs in the frequency domain or the plurality of slots in the time domain. The means may be the component 198 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 12:
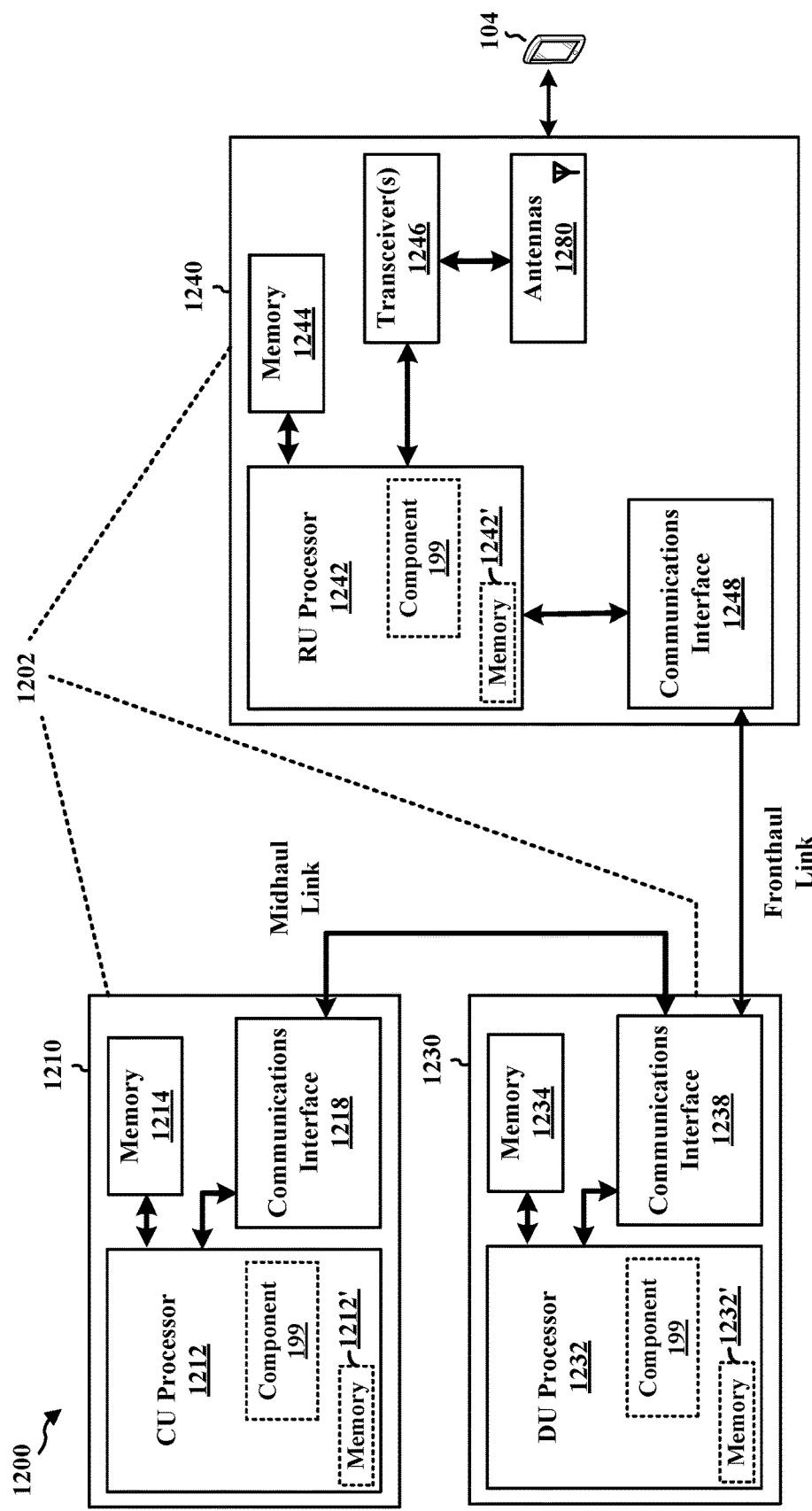
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit an indication of a CSI-RS configuration for a UE. The CSI-RS configuration may be transmitted to the UE. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The component 199 may be configured to transmit the set of CSI-RSs for the UE based on the CSI-RS configuration and the CDM for the set of CSI-RSs. The CDM for the set of CSI-RSs may be associated with at least one of the plurality of RBs or the plurality of slots. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for transmitting an indication of a CSI-RS configuration for a UE. The network entity 1202 may include means for transmitting an update to the CSI-RS configuration to the UE. The network entity 1202 may include means for receiving a report of at least one measurement for the set of CSI-RSs. The network entity 1202 may include means for receiving CS feedback based on the set of CSI-RSs. The network entity 1202 may include means for receiving a request for the CSI-RS configuration to include at least one CSI-RS RB group corresponding with at least one of the plurality of RBs in the frequency domain or the plurality of slots in the time domain. The network entity 1202 may include means for configuring the CSI-RS configuration to include at least one CSI-RS RB group corresponding with the plurality of RBs in the frequency domain in response to obtaining a second indication that the UE has a coherence bandwidth that meets or exceeds a coherence bandwidth threshold. The network entity 1202 may include means for configuring the CSI-RS configuration to include at least one CSI-RS RB group corresponding with the plurality of RBs in the time domain in response to obtaining a second indication that the UE has a coherence time that meets or exceeds a coherence time threshold. The means may be the component 199 of the network entity 1202 configured to perform the functions recited by the means. As described supra, the network entity 1202 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, where the method may include receiving an indication of a CSI-RS configuration. The CSI-RS configuration may be received from a network entity. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The method may include receiving the set of CSI-RSs based on the CSI-RS configuration and the CDM for the set of CSI-RSs. The CDM for the set of CSI-RSs may be associated with at least one of the plurality of RBs or the plurality of slots.

Aspect 2 is the method of aspect 1, where the indication of the CSI-RS configuration may be received via an RRC message.

Aspect 3 is the method of any of aspects 1 and 2, where the method may include receiving a second indication of an update to the CSI-RS configuration.

Aspect 4 is the method of aspect 3, where the update may be received via an RRC message, DCI, or MAC-CE.

Aspect 5 is the method of any of aspects 1 to 4, where the method may include performing at least one measurement for the set of CSI-RSs. The at least one measurement may be performed after the set of CSI-RSs is received. The at least one measurement may be an RSRP measurement or an SINR measurement.

Aspect 6 is the method of aspect 5, where the method may include transmitting a report of the at least one measurement for the set of CSI-RSs. The report may be transmitted after the at least one measurement is performed.

Aspect 7 is the method of any of aspects 1 to 6, where the method may include transmitting CS feedback based on the set of CSI-RSs. The CS feedback may be transmitted after the set of CSI-RSs is received.

Aspect 8 is the method of any of aspects 1 to 7, where the method may include estimating a timing or frequency of a network entity based on the set of CSI-RSs. The timing or the frequency may be estimated after the set of CSI-RSs is received.

Aspect 9 is the method of any of aspects 1 to 8, where the method may include performing at least one interference estimation based on the set of CSI-RSs. The at least one interference estimation may be performed after the set of CSI-RSs is received.

Aspect 10 is the method of any of aspects 1 to 9, where the method may include rate matching at least one downlink channel or signal based on the set of CSI-RSs. The at least one downlink channel or signal may be rate matched after the set of CSI-RSs is received.

Aspect 11 is the method of any of aspects 1 to 10, where the method may include performing a beam management procedure based on the set of CSI-RSs. The beam management procedure may be performed after the set of CSI-RSs is received.

Aspect 12 is the method of any of aspects 1 to 11, where the plurality of RBs may include a first RB and a second RB. The CSI-RS RB group may be located in a first RE location of the first RB and a second RE location of the second RB. The first RE location and the second RE location may be the same.

Aspect 13 is the method of any of aspects 1 to 12, where the plurality of RBs may include a first RB and a second RB. The CSI-RS RB group may be located in a first RE location of the first RB and a second RE location of the second RB. The first RE location and the second RE location may be different.

Aspect 14 is the method of any of aspects 1 to 13, where the method may include transmitting a request for the CSI-RS configuration to include at least one CSI-RS RB group corresponding with at least one of the plurality of RBs in the frequency domain or the plurality of slots in the time domain.

Aspect 15 is the method of aspect 14, where the request for the CSI-RS configuration may include a request for the at least one CSI-RS RB group to correspond with the plurality of RBs in the frequency domain. Transmitting the request for the CSI-RS configuration may be in response to obtaining a second indication that the UE has a coherence bandwidth that meets or exceeds a coherence bandwidth threshold.

Aspect 16 is the method of aspect 14, where the request for the CSI-RS configuration may include a request for the at least one CSI-RS RB group to correspond with the plurality of RBs in the time domain. Transmitting the request for the CSI-RS configuration may be in response to obtaining a second indication that the UE has a coherence time that meets or exceeds a coherence time threshold.

Aspect 17 is a method of wireless communication at a network entity, where the method may include transmitting an indication of a CSI-RS configuration for a UE. The CSI-RS configuration may be transmitted to the UE. The CSI-RS configuration may include at least one CSI-RS RB group associated with CDM for a set of CSI-RSs. The at least one CSI-RS RB group may correspond to at least one of a plurality of RBs in a frequency domain or a plurality of slots in a time domain. The CSI-RS method may include transmitting the set of CSI-RSs for the UE based on the CSI-RS configuration and the CDM for the set of CSI-RSs. The CDM for the set of CSI-RSs may be associated with at least one of the plurality of RBs or the plurality of slots.

Aspect 18 is the method of aspect 17, where the indication of the CSI-RS configuration may be transmitted via an RRC message.

Aspect 19 is the method of any of aspects 17 to 18, where the method may include transmitting an update to the CSI-RS configuration to the UE.

Aspect 20 is the method of aspect 19, where the update may be received via an RRC message, DCI) or a MAC-CE).

Aspect 21 is the method of any of aspects 17 to 20, where the method may include receiving a report of at least one measurement for the set of CSI-RSs. The report may be received after the set of CSI-RSs are transmitted.

Aspect 22 is the method of aspect 21, where the at least one measurement may include an RSRP measurement or an SINR measurement.

Aspect 23 is the method of any of aspects 17 to 22, where the method may include receiving CS feedback based on the set of CSI-RSs. The CS feedback may be received after the set of CSI-RSs are transmitted.

Aspect 24 is the method of any of aspects 17 to 23, where the plurality of RBs may include a first RB and a second RB. The CSI-RS RB group may be located in a first RE location of the first RB and a second RE location of the second RB. The first RE location and the second RE location may be the same.

Aspect 25 is the method of any of aspects 17 to 24, where the plurality of RBs may include a first RB and a second RB. The CSI-RS RB group may be located in a first RE location of the first RB and a second RE location of the second RB. The first RE location and the second RE location may be different.

Aspect 26 is the method of any of aspects 17 to 25, where the method may include receiving a request for the CSI-RS configuration to include at least one CSI-RS RB group corresponding with at least one of the plurality of RBs in the frequency domain or the plurality of slots in the time domain.

Aspect 27 is the method of any of aspects 17 to 26, where the method may include configuring the CSI-RS configuration to include at least one CSI-RS RB group corresponding with the plurality of RBs in the frequency domain in response to obtaining a second indication that the UE has a coherence bandwidth that meets or exceeds a coherence bandwidth threshold.

Aspect 28 is the method of any of aspects 17 to 27, where the method may include configuring the CSI-RS configuration to include at least one CSI-RS RB group corresponding with the plurality of RBs in the time domain in response to obtaining a second indication that the UE has a coherence time that meets or exceeds a coherence time threshold.

Aspect 29 is an apparatus for wireless communication, including: a memory; and at least one processor coupled to the memory and, based at least in part on information stored in the memory, the at least one processor is configured to implement any of aspects 1 to 28.

Aspect 30 is the apparatus of aspect 29, further including at least one of an antenna or a transceiver coupled to the at least one processor.

Aspect 31 is an apparatus for wireless communication including means for implementing any of aspects 1 to 28.

Aspect 32 is a computer-readable medium (e.g., a non-transitory computer-readable medium) storing computer executable code, where the code when executed by a processor causes the processor to implement any of aspects 1 to 28.

What is claimed is:

1. An apparatus for wireless communication at a user equipment (UE), comprising:
   memory; and
   at least one processor coupled to the memory and, based at least in part on information stored in the memory, the at least one processor is configured to:
   receive a first indication of a channel state information (CSI) reference signal (CSI-RS) configuration, wherein the CSI-RS configuration comprises a second indication of at least one CSI-RS resource block (RB) group (CSI-RS RB group) associated with code division multiplexing (CDM) for a set of CSI-RSs, wherein an orthogonal cover code (OCC) of a first CSI-RS RB group of the at least one CSI-RS RB group spans a plurality of RBs in a frequency domain or a time domain;
   receive the set of CSI-RSs; and
   process the set of CSI-RSs based on the OCC of the CSI-RS configuration, wherein the OCC indicates a plurality of ports for the first CSI-RS RB group, wherein a first set of ports of the plurality of ports corresponds to a first RB of the plurality of RBs and a second set of ports of the plurality of ports corresponds to a second RB of the plurality of RBs, wherein the first set of ports do not overlap with the second set of ports.

2. The apparatus of claim 1, further comprising a transceiver coupled to the at least one processor, wherein, to receive the indication of the CSI-RS configuration, the at least one processor is configured to:
   receive, via the transceiver, a radio resource control (RRC) message comprising the indication of the CSI-RS configuration.

3. The apparatus of claim 1, wherein the at least one processor is further configured to:
   transmit channel state (CS) feedback based on the set of CSI-RSs after a reception of the set of CSI-RSs.

4. The apparatus of claim 1, wherein the at least one processor is further configured to:
   estimate a timing or frequency of a network entity based on the set of CSI-RSs after a reception of the set of CSI-RSs.

5. The apparatus of claim 1, wherein the at least one processor is further configured to:
   perform at least one interference estimation based on the set of CSI-RSs after a reception of the set of CSI-RSs.

6. The apparatus of claim 1, wherein the at least one processor is further configured to:
   rate match at least one downlink channel or signal based on the set of CSI-RSs after a reception of the set of CSI-RSs.

7. The apparatus of claim 1, wherein the at least one processor is further configured to:
   perform a beam management procedure based on the set of CSI-RSs after a reception of the set of CSI-RSs.

8. The apparatus of claim 1, wherein a first port of the first set of ports is located in a first resource element (RE) location of the first RB and a second port of the second set of ports is located in a second RE location of the second RB, wherein the first RE location and the second RE location are same.

9. The apparatus of claim 1, wherein a first port of the first set of ports is located in a first RE location of the first RB and a second port of the second set of ports is located in a second RE location of the second RB, wherein the first RE location and the second RE location are different.

10. The apparatus of claim 1, wherein the at least one processor is further configured to:
receive a second indication of an update to the CSI-RS configuration.

11. The apparatus of claim 10, wherein, to receive the second indication of the update to the CSI-RS configuration, the at least one processor is configured to:
receive, via a radio resource control (RRC) message, downlink control information (DCI), or a medium access control (MAC) control element (MAC-CE), the second indication of the update to the CSI-RS configuration.

12. The apparatus of claim 1, wherein the at least one processor is further configured to:
perform at least one measurement for the set of CSI-RSs after a reception of the set of CSI-RSs, wherein the at least one measurement comprises a reference signal received power (RSRP) measurement or a signal-to-interference plus noise ratio (SINR) measurement.

13. The apparatus of claim 12, wherein the at least one processor is further configured to:
transmit a report of the at least one measurement for the set of CSI-RSs after the performance of the at least one measurement.

14. The apparatus of claim 1, wherein the at least one processor is further configured to:
transmit a request for the CSI-RS configuration to include at least one CSI-RS RB group associated with an OCC that spans the plurality of RBs in the frequency domain or the time domain before a reception of the indication of the CSI-RS configuration.

15. The apparatus of claim 14, wherein the request for the CSI-RS configuration comprises a request for the OCC associated with the at least one CSI-RS RB group to span the plurality of RBs in the frequency domain, wherein, to transmit the request for the CSI-RS configuration, the at least one processor is configured to:
transmit the request for the CSI-RS configuration in response to a determination that the UE has a coherence bandwidth that meets or exceeds a coherence bandwidth threshold.

16. The apparatus of claim 14, wherein the request for the CSI-RS configuration comprises a request for the OCC associated with the at least one CSI-RS RB group to span the plurality of RBs in the time domain, wherein, to transmit the request for the CSI-RS configuration, the at least one processor is configured to:
transmit the request for the CSI-RS configuration in response to a determination that the UE has a coherence time that meets or exceeds a coherence time threshold.

17. An apparatus for wireless communication at a network entity, comprising:
memory; and
at least one processor coupled to the memory and, based at least in part on information stored in the memory, the at least one processor is configured to:
transmit a first indication of a channel state information (CSI) reference signal (CSI-RS) configuration for a user equipment (UE), wherein the CSI-RS configuration comprises a second indication of at least one CSI-RS resource block (RB) group (CSI-RS RB group) associated with code division multiplexing (CDM) for a set of CSI-RSs, wherein an orthogonal cover code (OCC) of a first CSI-RS RB group of the at least one CSI-RS RB group spans a plurality of RBs in a frequency domain or a time domain; and
transmit the set of CSI-RSs for the UE based on the OCC of the CSI-RS configuration, wherein the OCC indicates a plurality of ports for the first CSI-RS RB group, wherein a first set of ports of the plurality of ports corresponds to a first RB of the plurality of RBs and a second set of ports of the plurality of ports corresponds to a second RB of the plurality of RBs, wherein the first set of ports do not overlap with the second set of ports.

18. The apparatus of claim 17, further comprising a transceiver coupled to the at least one processor, wherein, to transmit the indication of the CSI-RS configuration, the at least one processor is configured to:
transmit, via the transceiver, a radio resource control (RRC) message comprising the indication of the CSI-RS configuration.

19. The apparatus of claim 17, wherein the at least one processor is further configured to:
receive channel state (CS) feedback based on the set of CSI-RSs after a transmission of the set of CSI-RSs.

20. The apparatus of claim 17, wherein a first port of the first set of ports is located in a first resource element (RE) location of the first RB and a second port of the second set of ports is located in a second RE location of the second RB, wherein the first RE location and the second RE location are same.

21. The apparatus of claim 17, wherein a first port of the first set of ports is located in a first resource element (RE) location of the first RB and a second port of the second set of ports is located in a second RE location of the second RB, wherein the first RE location and the second RE location are different.

22. The apparatus of claim 17, wherein the at least one processor is further configured to:
receive a request for the CSI-RS configuration to include at least one CSI-RS RB group associated with an OCC that spans the plurality of RBs in the frequency domain or the time domain before a transmission of the indication of the CSI-RS configuration.

23. The apparatus of claim 17, wherein the at least one processor is further configured to:
configure the CSI-RS configuration to include at least one CSI-RS RB group associated with an OCC that spans the plurality of RBs in the frequency domain in response to a determination that the UE has a coherence bandwidth that meets or exceeds a coherence bandwidth threshold.

24. The apparatus of claim 17, wherein the at least one processor is further configured to:
configure the CSI-RS configuration to include at least one CSI-RS RB group associated with an OCC that spans the plurality of RBs in the time domain in response to a determination that the UE has a coherence time that meets or exceeds a coherence time threshold.

25. The apparatus of claim 17, wherein the at least one processor is further configured to:
transmit an update to the CSI-RS configuration to the UE.

26. The apparatus of claim 25, wherein, to transmit the update to the CSI-RS configuration, the at least one processor is configured to:
transmit, via a radio resource control (RRC) message, downlink control information (DCI), or a medium access control (MAC) control element (MAC-CE), the update to the CSI-RS configuration.

27. The apparatus of claim 17, wherein the at least one processor is further configured to:
   receive a report of at least one measurement for the set of CSI-RSs after a transmission of the set of CSI-RSs.

28. The apparatus of claim 27, wherein the at least one measurement comprises a reference signal received power (RSRP) measurement or a signal-to-interference plus noise ratio (SINR) measurement.

29. A method of wireless communication at a user equipment (UE), comprising:
   receiving a first indication of a channel state information (CSI) reference signal (CSI-RS) configuration, wherein the CSI-RS configuration comprises a second indication of at least one CSI-RS resource block (RB) group (CSI-RS RB group) associated with code division multiplexing (CDM) for a set of CSI-RSs, wherein an orthogonal cover code (OCC) of a first CSI-RS RB group of the at least one CSI-RS RB group spans a plurality of RBs in a frequency domain or a time domain;
   receiving the set of CSI-RSs; and
   processing the set of CSI-RSs based on the OCC of the CSI-RS configuration, wherein the OCC indicates a plurality of ports for the first CSI-RS RB group, wherein a first set of ports of the plurality of ports corresponds to a first RB of the plurality of RBs and a second set of ports of the plurality of ports corresponds to a second RB of the plurality of RBs, wherein the first set of ports do not overlap with the second set of ports.

30. A method of wireless communication at a network entity, comprising:
   transmitting a first indication of a channel state information (CSI) reference signal (CSI-RS) configuration for a user equipment (UE), wherein the CSI-RS configuration comprises a second indication of at least one CSI-RS resource block (RB) group (CSI-RS RB group) associated with code division multiplexing (CDM) for a set of CSI-RSs, wherein an orthogonal cover code (OCC) of a first CSI-RS RB group of the at least one CSI-RS RB group spans a plurality of RBs in a frequency domain or a time domain; and
   transmitting the set of CSI-RSs for the UE based on the OCC of the CSI-RS configuration, wherein the OCC indicates a plurality of ports for the first CSI-RS RB group, wherein a first set of ports of the plurality of ports corresponds to a first RB of the plurality of RBs and a second set of ports of the plurality of ports corresponds to a second RB of the plurality of RBs, wherein the first set of ports do not overlap with the second set of ports.

* * * * *